Oct. 16, 1962 G. B. STONE 3,058,234
DEVICE FOR REMOVING LUMPS FROM DRUM COATINGS
Filed Aug. 28, 1959
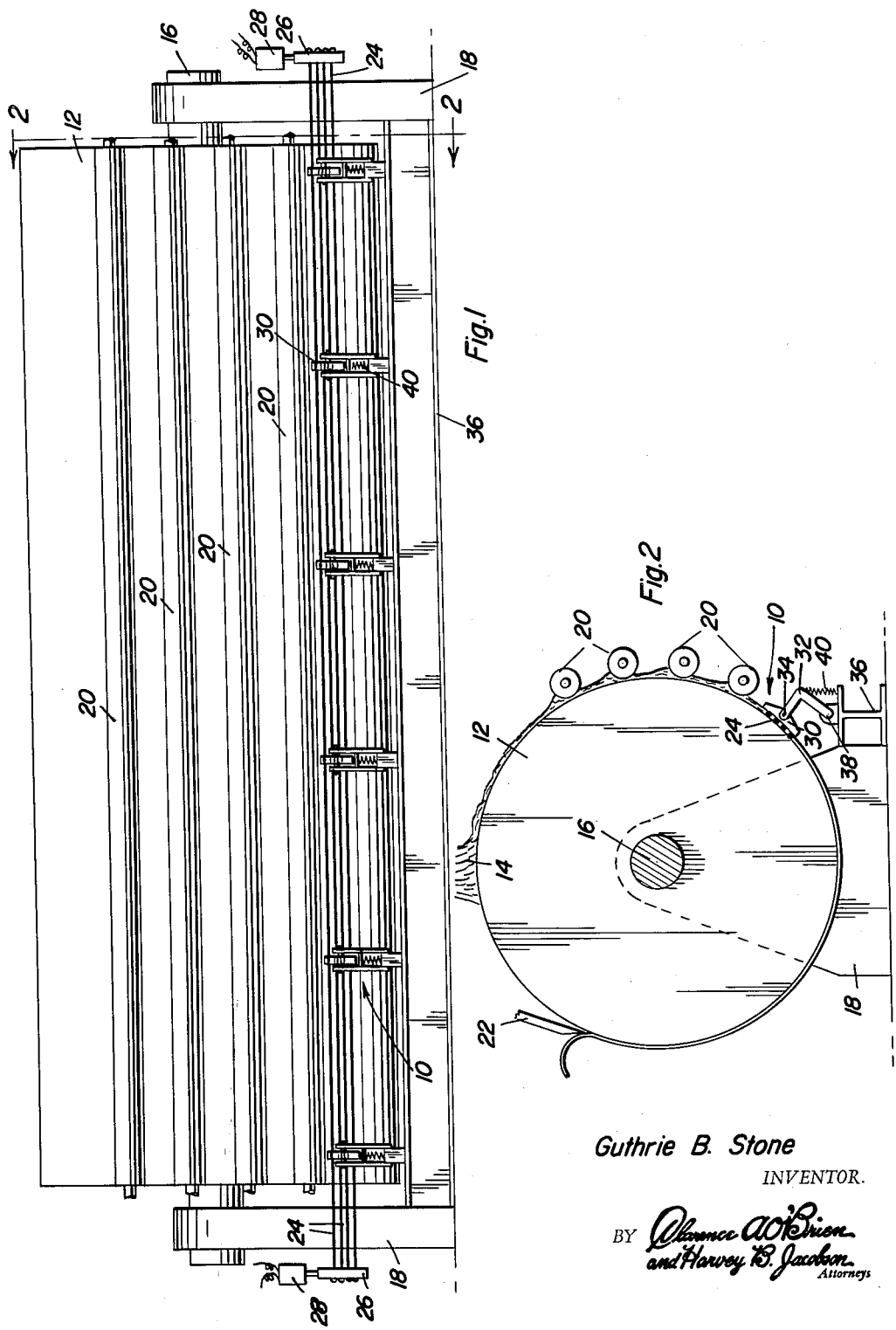
Guthrie B. Stone
INVENTOR.
BY *Clarence A. O'Brien*
*and Harvey B. Jacobson*
Attorneys

3,058,234
DEVICE FOR REMOVING LUMPS FROM DRUM COATINGS
Guthrie B. Stone, % Stone Conveyor Co., Inc., Honeoye, N.Y.
Filed Aug. 28, 1959, Ser. No. 836,726
6 Claims. (Cl. 34—110)

The present invention generally relates to an apparatus for removing lumps from the coating on a drum drier such as that used in the dehydration of potatoes to make potato flakes.

The U.S. Department of Agriculture has developed a process in which potato mash is applied to a drum drier by a series of rollers (usually four) with these applying rollers being followed by a "Teflon" coated roller which is used to flatten the lumps. This method and apparatus has been somewhat satisfactory for pilot plant or laboratory operations but in commercial size drums which have a length of 10 to 12 feet, the "Teflon" roll is impractical because of lateral deflections of the roll and difficulty in maintaining the close tolerance drum clearance. Therefore, it is the primary object of the present invention to provide a highly novel and efficient apparatus for removing the lumps from the coating rather than mashing them as in the above-mentioned process with the scraping or removing method being superior to the mashing method since the removal of the lumps does not alter the density characteristics of the coating.

Basically, the present invention incorporates the use of a plurality of wires that are under considerable tension and disposed in parallel relation to the surface of the drum in closely spaced relation thereto together with a plurality of spring urged hold-down elements for retaining the wires in position together with a vibrator for vibrating the wires for maintaining the wires in a clean condition and stripping the excess material off to a waste pan or the like.

A further important object of the present invention is to provide a device for removing lumps from a drum drier coating which is simple in operation, easy to install, effective for its particular purposes and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the drum drier and lump remover of the present invention; and FIGURE 2 is a transverse, vertical sectional view taken substantially upon a plane passing along section line 2—2 of FIGURE 1 illustrating the orientation of the lump remover to the drum drier.

Referring now specifically to the drawings, the numeral 10 generally designates the lump removing apparatus of the present invention which is associated with a conventional cylindrical drum 12 of a drum drier which receives the mash 14 from any suitable hopper source with the drum 12 being supported by a central shaft 16 and support members 18. The mash 14 is applied onto the surface of the drum 12 in the form of a coating by a plurality of applying rollers 20 which are arranged for sequential application of the mash onto the drum so that a relatively even coating will be applied to the drum. As shown in FIGURE 2, a removing blade 22 is provided adjacent the applying position of the hopper for the potato mash 14. After the mash has passed the last applying roller 20, it is desirable to remove any lumps therefrom. For accomplishing this purpose, there is provided a plurality of elongated wires 24 disposed in spaced parallel relation to each other and disposed in closely spaced parallel relation to the peripheral surface of the drum 12. The wires 24 are highly tensioned by any suitable means and may be constructed of stainless steel or provided with a "Teflon" coating. At each end of the wires 24, there is provided a bracket element 26 carried by a vibrator 28 whereby energization of the vibrator 28 will cause vibration of the wires 24 which will cause the excess material that may be carried by the wires to be discharged downwardly into a suitable waste pan, conveyor or the like (not shown).

The wires 24 are supported or pressed inwardly towards the drum at longitudinally spaced intervals by thin hold-down elements including hold-down members 30 which are pivotally mounted on an arm 32 by a pivot pin 34. The arm 32 is pivotally mounted on a support beam 36 by a pivot pin 38 and a compression coil spring 40 extends between the support beam 36 and the apex of the generally bell-crank shaped arm 32 thus urging the hold-down members 30 towards the periphery of the drum with such force that the wire will be held tightly to the drum but not hard enough to strip the potato flake whereby only excessive material such as high spots or lumps will be removed. While there are four wires illustrated, it is pointed out that more wires may be employed if desired and the device has been successfully employed with from four to six wires.

Thus, with the present invention, the problem of deflection of the formerly employed roller has been completely eliminated and this device operates on the principle of removing the objectionable excessive material and the objectionable lumps and provides a more accurately uniform coating or layer of dried flake on the drum for subsequent removal from the drum for cutting into the flakes and packing into containers with the apparatus for cutting dried flake into small flakes being a separate invention described in a co-pending application and the device for packing the flakes also being a separate invention described in a co-pending application.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for removing lumps from a freshly deposited, partially dried film coated on a drum of a drum drier, said drum being rotatable about a substantially horizontal axis, said device comprising a plurality of longitudinally extending, spaced parallel, tensioned wires arranged alongside of and adjacent to the periphery of the drum in parallel relation to the longitudinal axis of the drum, a plurality of spring-urged hold-down elements engaged with the outer surface of the wires in opposition to the periphery of the drum for holding the wires in parallel relation to the drum surface throughout the lengths of the wires, and means connected to the ends of the wires for supporting and vibrating the wires for removing excess material from the wires, said wires being disposed below a horizontal plane passing through the longitudinal axis of the drum whereby lumps removed from the coating on the drum by the wires will fall downwardly away from the peripheral surface of the drum.

2. The structure as defined in claim 1 wherein each of said spring-urged hold-down elements includes a hold-down member, a supporting arm pivotally attached to said hold-down member, a support beam pivotally supporting said arm, and a spring connected to the arm and said support beam for urging the arm and the hold-down member towards the drum with force sufficient to remove lumps and excess material in high spots but without sufficient force to completely remove partially dried film from the drum.

3. A device for removing projecting lumps from a freshly deposited material film coated on a drum of a drum drier, said drum being rotatable about a substantially horizontal axis, said device comprising a plurality of longitudinally extending, spaced, parallel, tensioned wires alongside of and adjacent to the periphery of the drum, said wires being parallel to the longitudinal axis of the drum, means supporting the ends of said wires, and means supporting the wires intermediate their length at a plurality of longitudinally spaced points for retaining the wires adjacent the periphery of the drum, said wires being disposed below a horizontal plane passing through the longitudinal axis of the drum whereby lumps removed from the coating on the drum by the wires will fall downwardly away from the peripheral surface of the drum.

4. The structure as defined in claim 3 wherein said means supporting the ends of the wires includes means for vibrating the wires and removing excess material therefrom.

5. The structure as defined in claim 3 wherein said means supporting the intermediate portions of the wires includes a longitudinal support member, a plurality of arms pivotally mounted on the support member, a hold-down member pivotally attached to the arm and engaging the wires, spring means interconnecting the arm and support member for urging the arm and hold-down member towards the wires and towards the peripheral surface of the drum.

6. In combination with a material drier having a moving surface, the path of movement of said surface including a vertical component, means for applying material to the moving surface in the form of a freshly deposited film for drying the film, an apparatus for removing lumps from the partially dried film on the surface, said apparatus comprising at least one elongated, tensioned wire disposed transversely of the path of movement of and adjacent the moving surface of the material drier, said wire being parallel to the moving surface throughout the width of the moving surface, means supporting the ends of the wire, and means supporting the wire intermediate its length for retaining the wire adjacent to and parallel to the moving surface of the drier at said vertical component for removing lumps and excess material in high spots in the partially dried film on the moving surface of the drier whereby the lumps removed from the film will fall away from the vertical component of the moving surface.

References Cited in the file of this patent

UNITED STATES PATENTS

| | | |
|---|---|---|
| 879,060 | Paucksch | Feb. 11, 1908 |
| 2,377,189 | Stanley | May 29, 1945 |